(12) United States Patent
Hirasawa et al.

(10) Patent No.: US 11,461,736 B2
(45) Date of Patent: Oct. 4, 2022

(54) PRESENCE STATUS DISPLAY SYSTEM AND PRESENCE STATUS DISPLAY METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 16/971,206

(22) PCT Filed: Feb. 7, 2019

(86) PCT No.: PCT/JP2019/004501
§ 371 (c)(1),
(2) Date: Aug. 19, 2020

(87) PCT Pub. No.: WO2019/163542
PCT Pub. Date: Aug. 29, 2019

(65) Prior Publication Data
US 2021/0097488 A1    Apr. 1, 2021

(30) Foreign Application Priority Data
Feb. 22, 2018 (JP) .............................. JP2018-029349

(51) Int. Cl.
*G06Q 10/10* (2012.01)
*G06V 20/52* (2022.01)
*G06V 40/16* (2022.01)

(52) U.S. Cl.
CPC ............. *G06Q 10/10* (2013.01); *G06V 20/52* (2022.01); *G06V 40/172* (2022.01)

(58) Field of Classification Search
CPC .... G06Q 20/386; G06Q 10/10; H04L 51/043; H04L 12/1813; G06F 2203/011;
(Continued)

(56) References Cited

U.S. PATENT DOCUMENTS 11,212,487 B2 * 12/2021 Hirasawa ........... G06Q 10/0639
2004/0095467 A1 * 5/2004 Koizumi ............ G08B 13/19673
348/169
(Continued)

FOREIGN PATENT DOCUMENTS

JP      07-058823       3/1995
JP      2001-186490     7/2001
(Continued)

OTHER PUBLICATIONS

International Search Report issued in International Patent Application No. PCT/JP2019/004501, dated Apr. 2, 2019, along with an English translation thereof.

*Primary Examiner* — Dung Hong
(74) *Attorney, Agent, or Firm* — Greenblum & Bernstein, P.L.C.

(57) ABSTRACT

To present to a user whether a person to be visited is staying in a target area and whether the person to be visited is in a state where the person is unable to deal with a visitor, the present invention detects whether there is any person staying in the target area based on images from a camera, detects whether each person staying in the target area is in a state where the person is unable to deal with a visitor, and generates display information displaying state information regarding whether each person is in the state where the person is unable to deal with a visitor, together with stay information regarding whether there is any person staying in the target area.

8 Claims, 7 Drawing Sheets

(58) Field of Classification Search
CPC .. G06V 40/171; G06V 40/176; G06V 10/768; G06V 20/52
See application file for complete search history.

(56) References Cited

U.S. PATENT DOCUMENTS

| | | | | |
|---|---|---|---|---|
| 2006/0023915 | A1* | 2/2006 | Aalbu | G01S 13/04 |
| | | | | 382/103 |
| 2007/0016649 | A1* | 1/2007 | Nishiki | H04L 67/54 |
| | | | | 709/206 |
| 2011/0276396 | A1* | 11/2011 | Rathod | G06Q 20/10 |
| | | | | 707/706 |
| 2015/0003595 | A1* | 1/2015 | Yaghi | H04M 3/5175 |
| | | | | 379/85 |
| 2020/0029884 | A1* | 1/2020 | Arai | A61B 5/168 |

FOREIGN PATENT DOCUMENTS

| | | | |
|---|---|---|---|
| JP | 2002-260110 | | 9/2002 |
| JP | 2011-123579 | | 6/2011 |
| JP | 2011-176599 | | 9/2011 |
| JP | 2011176599 | A * | 9/2011 |
| JP | 2013-182450 | | 9/2013 |
| JP | 2013182450 | A * | 9/2013 |

\* cited by examiner

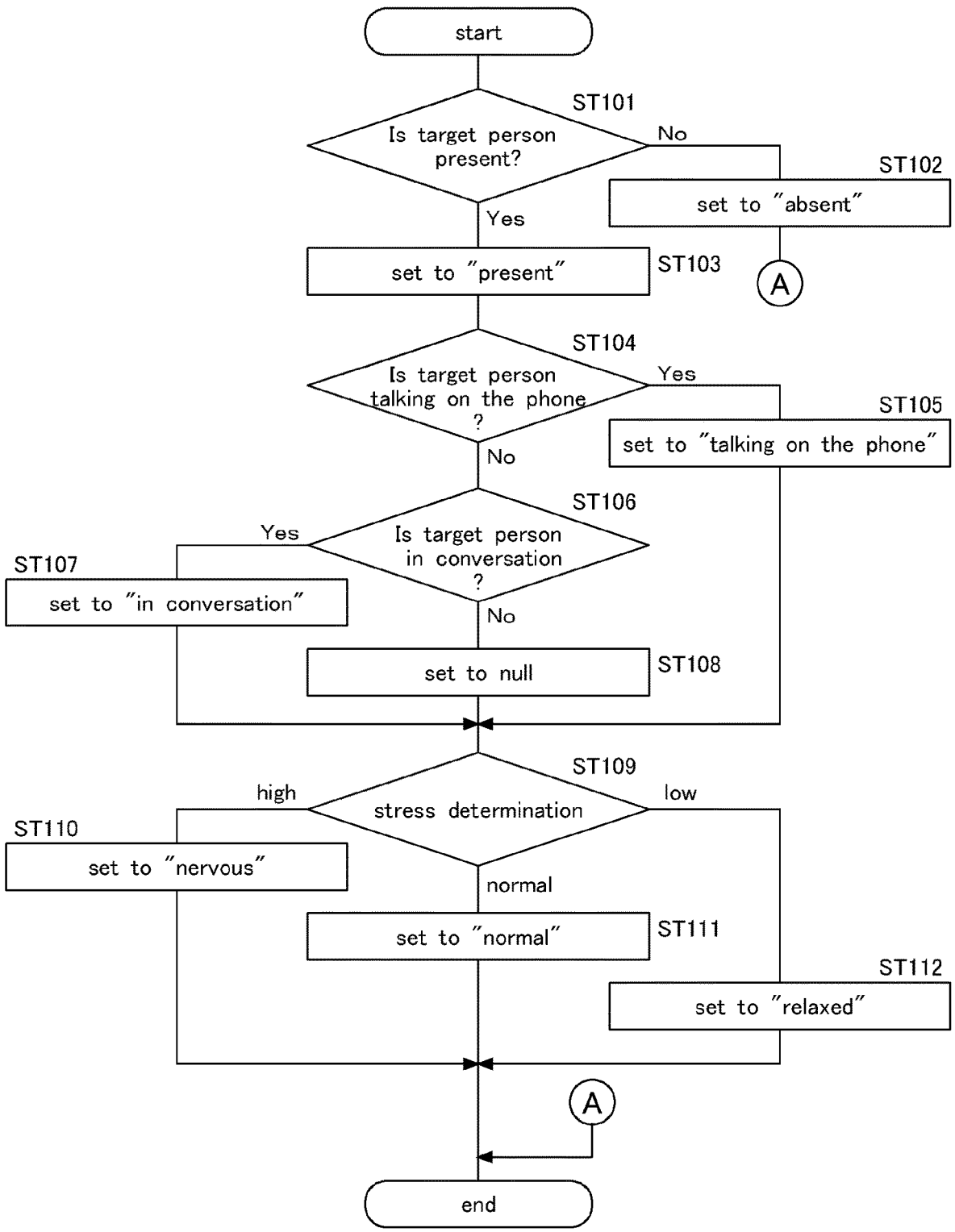

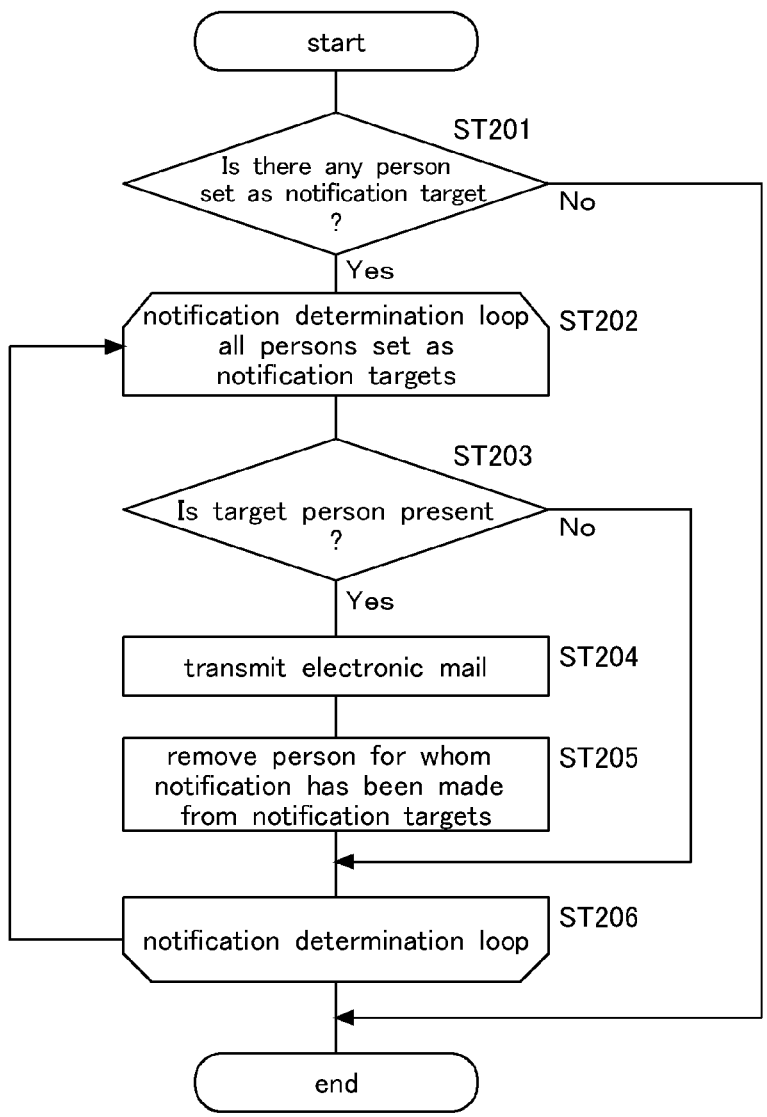

PRESENCE STATUS DISPLAY SYSTEM AND PRESENCE STATUS DISPLAY METHOD

TECHNICAL FIELD

The present invention relates to a staying status display system and a staying status display method for generating display information regarding a person staying status in a target area in a facility based on images captured by a camera installed in the target area.

BACKGROUND ART

A facility, such as an office building, is often equipped with a monitoring system in which a camera for capturing images of an interior of the facility is installed and the status in the facility is monitored based on the images captured by the camera. If configuration is made to acquire information regarding a person staying status in the facility by using the images captured by the camera and to present the information to a user, the user can easily confirm whether the person the user wants to see for business is at his/her own seat or the like, whereby convenience for the user is improved.

As such a technology for presenting the person staying status to the user, conventionally there is known a system in which image processing is performed in real time on the images of persons sitting on seats and the images of telephone sets captured by cameras installed in an office or the like to determine whether a person is present or absent, and when the person is present, it is determined whether the person is talking on the phone (see Patent Document 1).

PRIOR ART DOCUMENT(S)

Patent Document(s)

Patent Document 1: JPH7-058823A

SUMMARY OF THE INVENTION

Task to be Accomplished by the Invention

As in the conventional technology, by detecting whether a person is talking on the phone and presenting the phone talk status of the person to the user, it is possible to eliminate a problem that, when, knowing that the person to be visited is present, the user visits the person, the person is talking on the phone and the user cannot talk to the person.

On the other hand, when the person to be visited is not talking on the phone, there still are cases where it is difficult to talk to the person. For example, when the person to be visited is in conversation with another person or is very busy due to urgent work, it is difficult to talk to the person. Therefore, a technology is desired for detecting whether the person is in a state where the person is unable to deal with a visitor, which includes when the person is talking on the phone, and presenting it to the user.

However, since the conventional technology is related to phone calling, there is a problem that it only presents the phone talk status of the person to the user and cannot present to the user whether the person is in a state where the person is unable to deal with a visitor due to a reason other than that the person is talking on the phone.

In view of the above, a primary object of the present invention is to provide a staying status display system and a staying status display method capable of presenting to a user whether the person to be visited is staying in a target area and whether the person to be visited is in a state where the person is unable to deal with a visitor.

Means to Accomplish the Task

A staying status display system of the present invention is a staying status display system for executing, with a processor, a process of acquiring, in real time, images captured by a camera installed in a target area and generating display information regarding a current person staying status in the target area, wherein the processor is configured to detect whether there is any person staying in the target area based on the images from the camera, detect whether each person staying in the target area is in a state where the person is unable to deal with a visitor, and generate display information for displaying state information regarding whether each person is in the state where the person is unable to deal with a visitor, together with stay information regarding whether there is any person staying in the target area.

A staying status display method of the present invention is a staying status display method for executing, with a processor, a process of acquiring, in real time, images captured by a camera installed in a target area and generating display information regarding a current person staying status in the target area, the method comprising: detecting whether there is any person staying in the target area based on the images captured by the camera, detecting whether each person staying in the target area is in a state where the person is unable to deal with a visitor, and generating display information for displaying state information regarding whether each person is in the state where the person is unable to deal with a visitor, together with stay information regarding whether there is any person staying in the target area.

Effect of the Invention

According to the present invention, it is possible to present to the user whether the person to be visited is staying in the target area and whether the person to be visited is in a state where the person is unable to deal with a visitor.

BRIEF DESCRIPTION OF THE DRAWINGS

FIG. 6 is a flowchart showing a procedure of a setting process regarding presence information and state information performed by the facility management device 2; and FIG. 7 is a flowchart showing an operating procedure of notification control performed by the facility management device 2.

MODES FOR CARRYING OUT THE INVENTION

Figure 1:
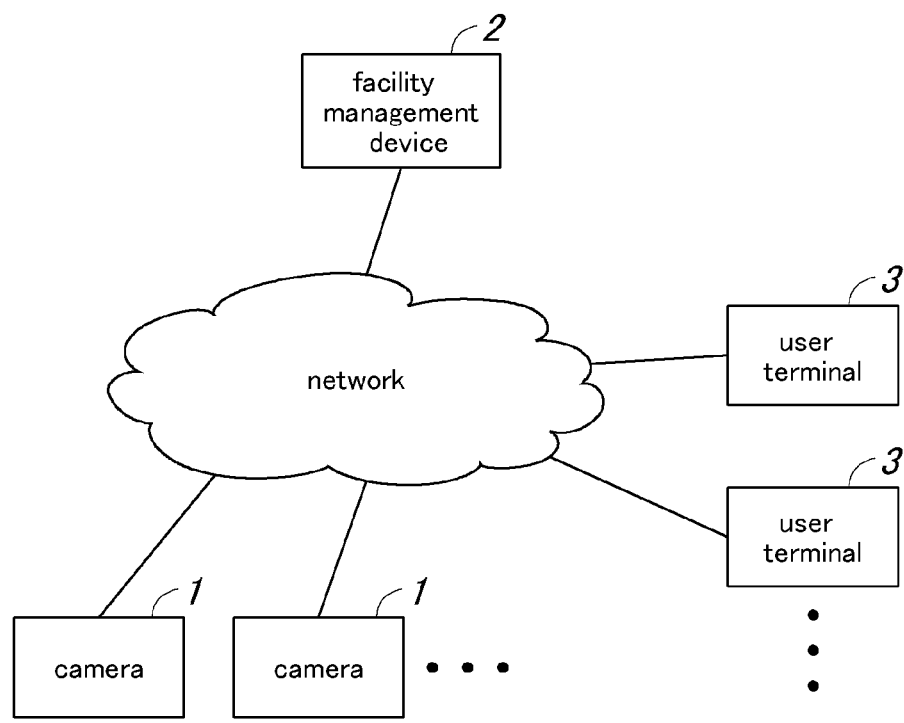
FIG. 1 is an overall configuration diagram of a staying status display system according to the present embodiment.

A first aspect of the present invention made to accomplish the object is a staying status display system for executing, with a processor, a process of acquiring, in real time, images captured by a camera installed in a target area and generating display information regarding a current person staying status in the target area, wherein the processor is configured to detect whether there is any person staying in the target area based on the images from the camera, detect whether each person staying in the target area is in a state where the person is unable to deal with a visitor, and generate display information for displaying state information regarding whether each person is in the state where the person is unable to deal with a visitor, together with stay information regarding whether there is any person staying in the target area.

According to this, it is possible to present to the user whether the person to be visited is staying in the target area and whether the person to be visited is in a state where the person is unable to deal with a visitor.

In a second aspect of the present invention, the processor is configured to receive an operation of a user of selecting a person and setting the selected person as a notification target, and when the stay information regarding the person set as a notification target is updated, to transmit a notification indicating that the stay information is updated to a user terminal.

According to this, the user can know a suitable opportunity to visit. Note that the processor may be configured such that, when the state information is updated, the processor transmits a notification indicating that the state information is updated to the user terminal.

In a third aspect of the present invention, the processor is configured to generate a person list screen in which person images are displayed in an arrangement, and display a state icon representing whether each person is in the state where the person is unable to deal with a visitor in the person list screen as the state information.

According to this, the person staying status in the target area can be confirmed collectively, and further, whether each person is in the state where the person is unable to deal with a visitor can be readily grasped.

In a fourth aspect of the present invention, the processor is configured to generate a map screen in which a state icon representing whether each person is in the state where the person is unable to deal with a visitor is superimposed, as the state information, at a position of a corresponding person on a map image representing the target area, and in response to an operation of a user selecting a person, display a person image of the selected person on the map screen.

According to this, the person staying status in the target area can be confirmed collectively, and further, whether each person is in the state where the person is unable to deal with a visitor can be readily grasped.

In a fifth aspect of the present invention, the state information is configured to represent at least one of a phone talk state, a conversation state, and a stress state.

According to this, it is possible to readily grasp whether each person is in the phone talk state, the conversation state, or the stress state as the state where the person is unable to deal with a visitor.

In a sixth aspect of the present invention, the processor is configured to determine whether each person staying in the target area is in conversation based on the images captured by the camera.

According to this, it is possible to acquire state information representing that the person is in conversation.

In a seventh aspect of the present invention, the processor is configured to determine whether each person staying in the target area is in a nervous state based on the images captured by the camera.

According to this, it is possible to acquire state information representing that the person is in the nervous state.

An eighth aspect of the present invention is a staying a status display method for executing, with a processor, a process of acquiring, in real time, images captured by a camera installed in a target area and generating display information regarding a current person staying status in the target area, the method comprising: detecting whether there is any person staying in the target area based on the images captured by the camera, detecting whether each person staying in the target area is in a state where the person is unable to deal with a visitor, and generating display information for displaying state information regarding whether each person is in the state where the person is unable to deal with a visitor, together with stay information regarding whether there is any person staying in the target area.

According to this, as in the first aspect of the present invention, it is possible to present to the user whether the person to be visited is staying in the target area and whether the person to be visited is in a state where the person is unable to deal with a visitor.

In the following, an embodiment of the present invention will be described with reference to the drawings.

FIG. 1 is an overall configuration diagram of a staying status display system according to the present embodiment.

This staying status display system is for generating display information regarding a person staying status in each room (target area) in a facility and presenting the display information to a user, and includes cameras 1, a facility management device 2, and user terminals 3. The cameras 1, the facility management device 2, and the user terminals 3 are connected via a network.

The cameras 1 are installed in each room (target area) in the facility to capture images of persons staying in each room.

The facility management device 2 is configured to receive images transmitted from the cameras 1 and to analyze the images, thereby generating display information regarding the person staying status in each room (target area) in the facility.

Each user terminal 3 may be a PC, a tablet terminal or the like operated by the user. The user terminal 3 is configured to display a screen regarding the person staying status in each room (target area) in the facility based on the display information transmitted from the facility management device 2, and the user can confirm, by viewing the screen, the person staying status in each room in the facility.

Figure 2:
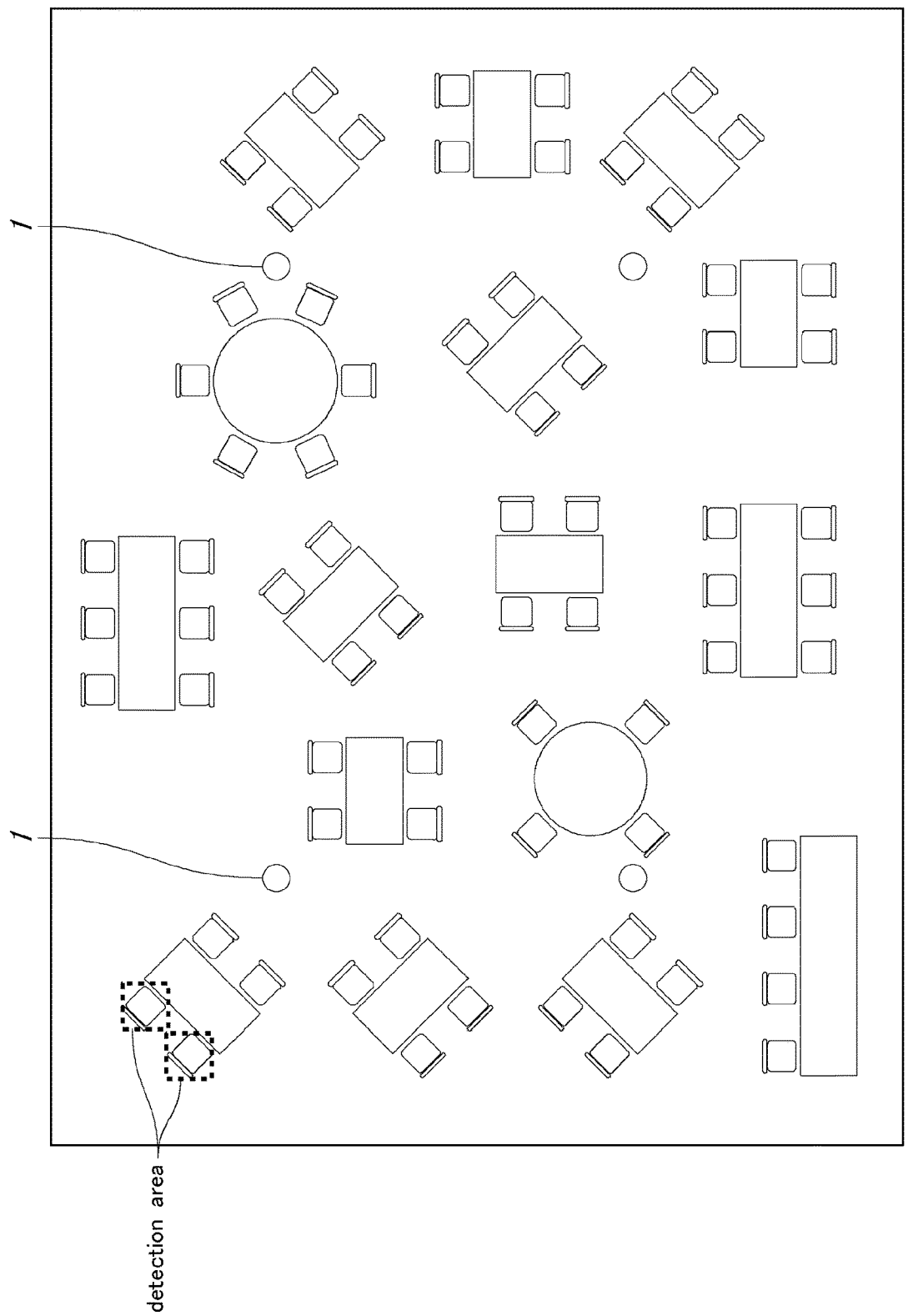
FIG. 2 is an explanatory diagram showing a room layout in a facility, an installation status of cameras 1, and a setting status of detection areas.

Next, description will be made of a room layout in the facility, an installation status of the cameras 1, and detection areas set in the images taken by the cameras 1. FIG. 2 is an explanatory diagram showing a room layout in the facility, an installation status of the cameras 1, and a setting status of the detection areas.

In the room (office), desks and seats (chairs) are arranged, in which one seat is assigned to each person and each person sits on the assigned seat to do the task.

The cameras 1 are installed on the ceiling of the room to capture images of persons staying in the room. As the cameras 1, cameras such as omnidirectional cameras configured to capture images having a field of view of 360 degrees by using a fisheye lens, box cameras configured to capture images having a prescribed angle of view, or the like are used.

In the present embodiment, a detection area (rectangular area shown by a dotted line) is pre-set for each seat in the images taken by the cameras 1, and based on the images of the detection areas, whether each person is seated in his/her own seat is detected.

Each detection area is set at a position where a body of the person seated in the seat is supposed to be present, and the detection areas are set based on the size of the body of the person such that one detection area corresponds to one person. Each detection area may be set by the user performing an operation of specifying a range of the detection area on the screen displaying the images taken by the cameras 1, but it is also possible to detect objects (chairs and desks) in the images taken by the cameras 1 and to set the detection areas based on the detection result.

Note that in the present embodiment, a presence detection of detecting presence of a person is performed using the images taken by the cameras 1. For this presence detection, the images captured by omnidirectional cameras configured to capture the images of the persons from above are suitable. Also, in the present embodiment, non-contact vital sensing for estimating the heart rate of each person using the images taken by the cameras 1 is performed. For this non-contact vital sensing, the images captured by box cameras configured to capture images of the faces of the persons from the front are suitable.

In the present embodiment, whether each person is seated in his/her own seat is detected in the room in which each person is assigned one seat beforehand, but it is also possible to detect who are staying in a room such as an office with a shared workspace system, a conference room, and a lounge, in which the seats are not assigned to specific persons beforehand. In this case, it is preferred to identify the persons in the images taken by the cameras 1 by using technology such as face recognition.

Figure 3:
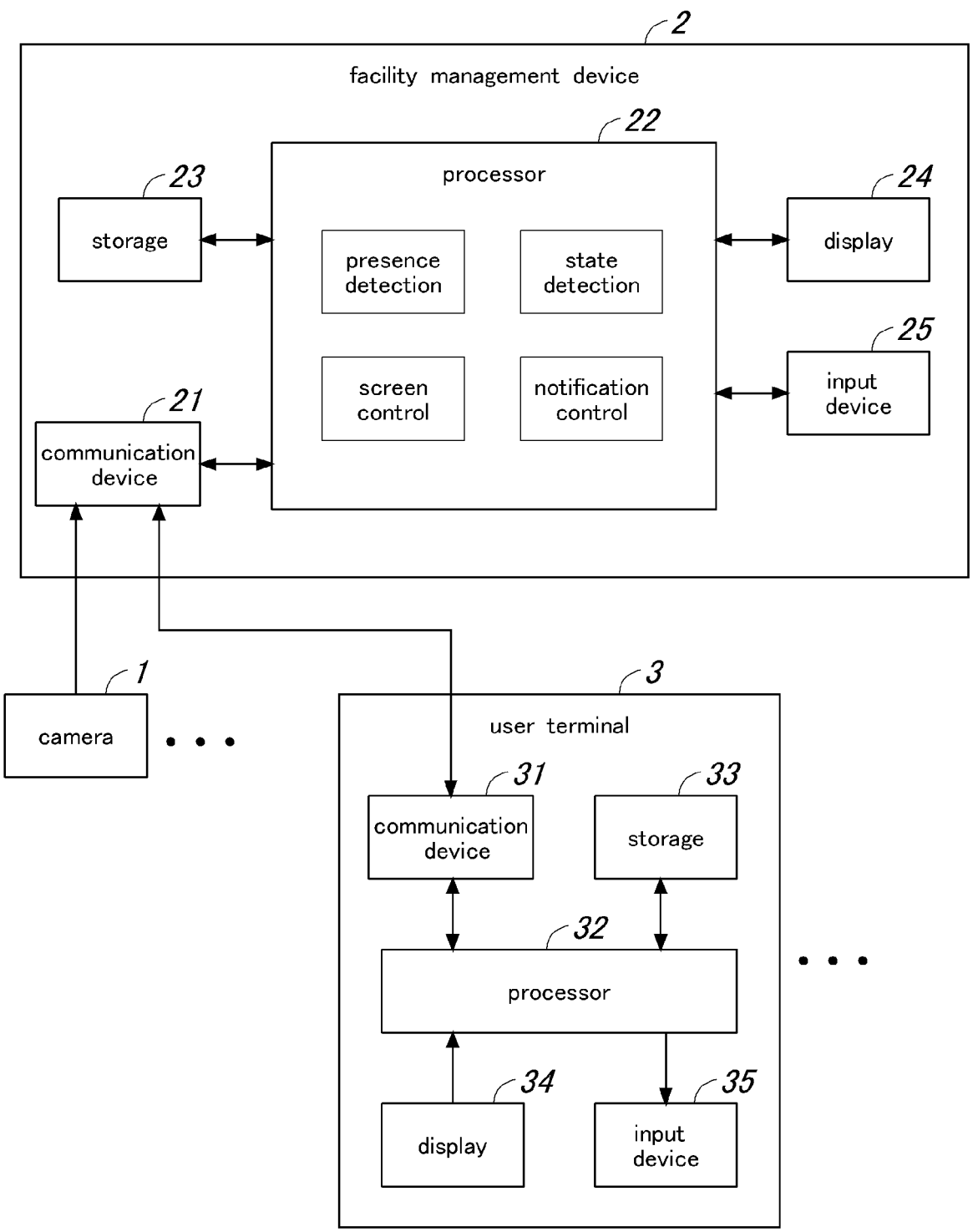
FIG. 3 is a block diagram showing a schematic configuration of a facility management device 2 and a user terminal 3.

Next, description will be made of the schematic configuration of the facility management device 2 and the user terminal 3. FIG. 3 is a block diagram showing the schematic configuration of the facility management device 2 and the user terminal 3.

The facility management device 2 is provided with a communication device 21, a processor 22, a storage 23, a display 24 (display device), and an input device 25.

The communication device 21 is configured to communicate with the cameras 1 to receive the images transmitted from the cameras 1. Further, the communication device 21 is configured to communicate with the user terminals 3 to deliver screen display information to the user terminals 3 and to receive operation information from the user terminals 3.

The storage 23 is configured to store the images received by the communication device 21 from the cameras 1, various setting information such as setting information regarding the detection areas, programs to be executed by the processor 22, and so on.

The display 24 is configured to display a screen (not shown in the drawings) for inputting the detection areas and the like. The input device 25 is used by an operator to perform an operation such as inputting the detection areas.

The processor 22 performs various processes by executing the programs stored in the storage 23. In the present embodiment, the processor 22 performs processes of presence detection, state detection, screen control, and notification control.

In the process of presence detection, based on the images taken by the cameras 1, whether each seat is occupied by a person is detected in real time to acquire presence information (stay information) regarding the person presence status. In the present embodiment, staying of a person in each of the detection areas for the respective seats set on the images beforehand is detected at regular intervals thereby to acquire information regarding the person presence status in each detection area at regular intervals.

In the present embodiment, whether each seat is occupied by a person is detected based on a change in the images in the detection area because if a person stays, some change will occur in the images. Specifically, first, from the image at each of successive time points separated by a prescribed sampling period (for example. one minute), an image of the detection area at each time point is cut out. Then, an image change rate is acquired for the image of the detection area at each time point. At this time, by comparing with the image at the immediately preceding time point that is separated by the sampling period, an image change rate relative to the image at the immediately preceding time point is acquired. Subsequently, based on the image change rate at each time point, presence or absence of a person in the detection area is determined. Then, based on the determination result, stay information representing the presence or absence of a person at each of the successive time points separated by the sampling period is generated. Note that in the presence detection process, instead of relaying on the image change rate described above, it is possible to use a discriminator that has been made to learn the two classes consisting of a present state and an absent state beforehand through deep learning. When performing the presence detection process, a likelihood (probability) of the images of the detection area showing the present state and a likelihood of the same showing the absent state are obtained by the discriminator and the two likelihoods are compared, whereby it is possible to determine which of presence and absence is shown.

In the process of state detection, when it is determined that a person is present in the process of presence detection, whether the person is in a state where the person is unable to deal with a visitor is detected based on the images taken by the cameras 1, to thereby acquire state information regarding the state of the person. In the present embodiment, phone talk determination for determining whether the person is talking on the phone, conversation determination for determining whether the person is in conversation, and stress determination for determining the degree of stress of the person are performed.

In the phone talk determination, when a device to be held close to the ear when one talks on the phone; namely, a mobile phone (including a smart phone), a receiver of a fixed-line phone, an earphone, or the like, is detected in the vicinity of the head of the person from the images of the detection area, it is determined that the person is talking on the phone.

In the conversation determination, when a person other than the target person is detected near the target person from the images around the detection area, it is determined that the target person is in conversation. At this time, to exclude the persons passing nearby, it is preferred to determine that the target person is in conversation when the state where the other person is detected continues for a prescribed time period. The conversation determination may be performed by picking up speech uttered by the other person by a microphone near the target person. By combining the person detection from the images and the speech detection using the microphone, it is possible to improve the accuracy of the conversation determination.

In the stress determination, the heart rate of the person is estimated by non-contact vital sensing based on the images taken by the cameras 1, and a stress state in accordance with a degree of stress of the person is determined based on the heart rate. Note that the non-contact vital sensing estimates the heart rate in real time from a change in the color of the skin caused by contraction of blood vessels in the face detected from the face images of the person.

Here, when the heart rate is equal to or higher than a prescribed first threshold value, it is determined that the person is in a nervous state. Also, when the heart rate is lower than a prescribed second threshold value, it is determined that the person is in a relaxed state. When the heart rate is lower than the prescribed first threshold value and equal to or higher than the second threshold value, it is determined that the person is in a normal state.

Note that in the present embodiment, the heart rate of the person is estimated by non-contact vital sensing based on the images taken by the cameras 1 and the stress state of the person is determined based thereon, but it is also possible to pick up the voice of the person with a microphone and to determine the stress state of the person based on the voice.

In the process of screen control, display information of a presence status presentation screen to be displayed on each user terminal 3 is generated, and the display information is transmitted to the user terminal 3 to cause the user terminal 3 to display the presence status presentation screen. In this presence status presentation screen, the person presence status acquired by the presence detection is displayed, and in addition, the state of the person acquired by the state detection is displayed. In the present embodiment, as the presence status presentation screen, a person list screen (see FIG. 4) which displays the presence status and the state of each person so as to be arranged person-by-person, a map screen (see FIG. 5) which displays the presence status and the state of each person on a map of the room are display. This presence status presentation screen is update at regular intervals in accordance with the result of the presence detection and the result of the state detection.

In the process of notification control, when the presence information (stay information) regarding whether each person is present is updated, namely, when the person who was absent returns to his/her own seat and thereby the person is found to be present, this is notified to the user via electronic mail.

The user views the presence status presentation screen (see FIG. 4 and FIG. 5), and in a case where the person to be visited is absent or in a case where the person is present but is either talking on the phone, in conversation, or in the nervous state, the user desists from visiting the person. In this case, the user may set the person to be visited as a notification target so that, when the person returns to his/her own seat, electronic mail is transmit to the user terminal 3.

Note that in the present embodiment, electronic mail is transmitted to the user terminal 3, but it is also possible to transmit a message representing that the presence information is updated with a known communication method with which the terminals connected to the network exchange messages with one another.

Also, in the present embodiment, a notification is made at a timing when the presence information is updated, but it is also possible to make a notification at a timing when the state information is updated together with the presence information. Specifically, when it is determined that, based on the phone talk state, the conversation state, and the stress state considered comprehensively, any condition preventing the person to be visited from dealing with a visitor is resolved and a state suitable to visit is achieved, namely, when the person has returned to his/her own seat to be in the "present" state and the state of the person becomes none of "talking on the phone," "in conversation," and "in the nervous state," a notification representing that the timing is suitable to visit is made.

Also, configuration may be simply made such that, at a timing when the presence information or the state information is updated, the content of the update is notified to the user, without consideration on whether the person to be visited is in a state suitable to visit.

Each user terminal 3 is equipped with a communication device 31, a processor 32, a storage 33, a display 34, and an input device 35.

The communication device 31 is configured to communicate with the facility management device 2. The storage 33 is configured to store programs to be executed by the processor 22 and the like. The processor 32 is configured to control operations of various parts of the user terminal 3 and, in response to an operation performed by the user on the input device 35, receives the display information regarding the screen (see FIG. 4 and FIG. 5) transmitted from the facility management device 2 with the communication device 31 and causes the display 34 to display a staying status presentation screen in accordance with the display information.

Note that when the user terminal 3 is a tablet terminal or the like, the input device 35 consists of a touch panel and, in combination with a display panel serving as the display 34, constitutes a touch panel display.

Figure 4:
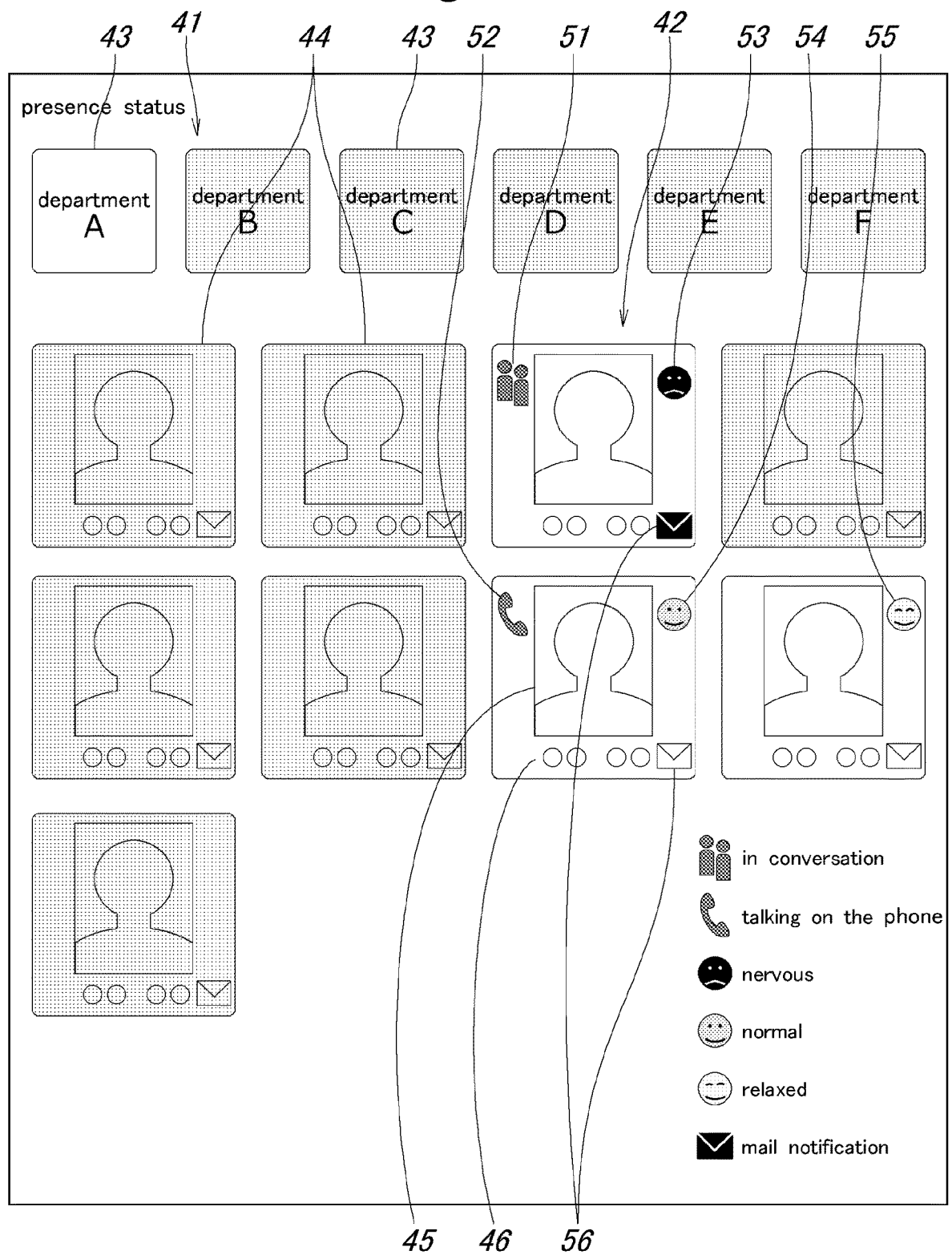
FIG. 4 is an explanatory diagram showing a person list screen displayed on the user terminal 3.

Next, description will be made of the person list screen displayed on the user terminal 3. FIG. 4 is an explanatory diagram showing the person list screen.

In this person list screen, a department selection section 41 and a list display section 42 are provided.

In the department selection section 41, department icons 43 are displayed to be arranged in line. When one of the department icons 43 is operated, the persons belonging to the corresponding department are displayed in the list display section 42.

In the list display section 42, person-by-person display sections 44 are displayed in an arrangement. In each person-by-person display section 44, a face image 45 and a name 46 of the corresponding person are displayed. When a person is absent, the corresponding person-by-person display section 44 is displayed to be grayed out.

Note that in the present embodiment, as a person image for identifying each person, the face image of the person (image of the face of the person taken beforehand) is displayed, but this person image may be an image (cartoon portrait, avatar) schematically depicting the characteristics of appearance of the person.

Further, in the person-by-person display section 44, an "in-conversation" icon 51 is displayed when the person is in conversation, and an "on-phone" icon 52 is displayed when the person is talking on the phone.

In addition, a "nervous" icon 53 is displayed when the stress state of the person is a nervous state, a "normal" icon 54 is displayed when the stress state of the person is a normal state, and a "relaxed" icon 55 is displayed when the stress state of the person is a relaxed state.

Furthermore, an email icon 56 is displayed in the person-by-person display section 44. When this email icon 56 is operated, the corresponding person is set as a notification target. At this time, the display mode of the icon 56 is changed; for example, the icon 56 is highlighted. Note that when the person is in a state suitable to visit, it is possible not to display the email icon 56 by taking into account the necessity of notification.

Figure 5:
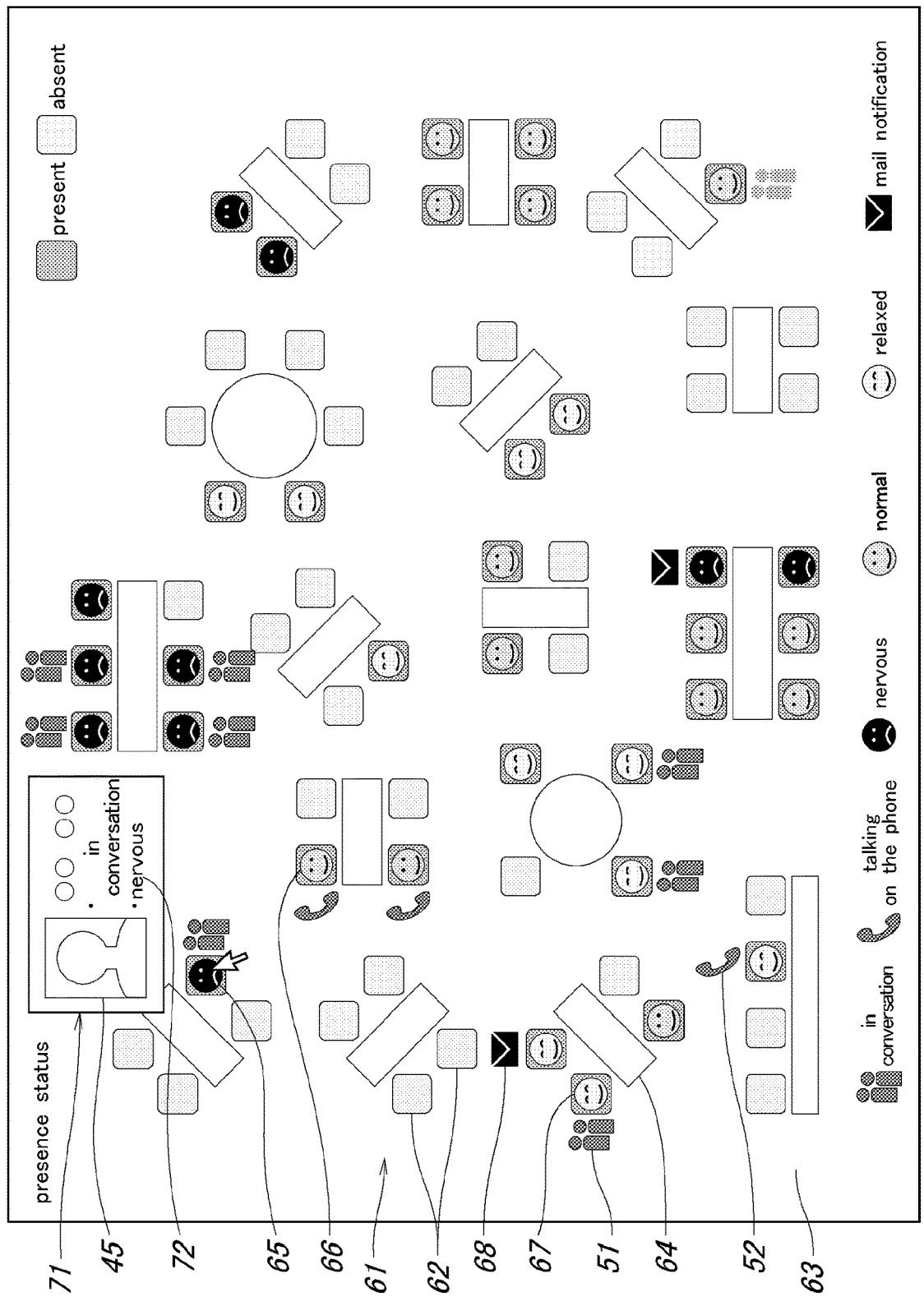
FIG. 5 is an explanatory diagram showing a map screen displayed on the user terminal 3.

Next, description will be made of the map screen displayed on the user terminal 3. FIG. 5 is an explanatory diagram showing the map screen. Note that by displaying beforehand a screen for selecting a department (floor), which may be similar to the department selection section 41 provided in the person list screen (see FIG. 4), to allow the user to select a department in the screen, the map screen of the selected department is displayed.

In this map screen, a presence map 61 representing the presence status (staying status) of each person is displayed. In this presence map 61, seat icons 62 representing the presence status of the respective seats are displayed to be superimposed on an area map 63 (map image) representing the office layout. The area map also has desk images 64 drawn thereon.

The display mode of each seat icon 62 changes depending on the presence status (present or absent). In the present embodiment, the color changes depending on the presence status; for example, the seat icon 62 is displayed in red in the case of presence and in gray in the case of absence. Note that it is also possible to display characters representing presence or absence depending on the presence status or to display the face image of the person in the case of presence.

Further, in this map screen, when a person is in conversation, the "in-conversation" icon 51 is displayed near the seat icon 62 of the person, and when a person is talking on the phone, the "on-phone" icon 52 is displayed near the seat icon 62 of the person.

In addition, when the stress state of the person is a nervous state, a "nervous" image 65 is displayed on the seat icon 62, when the stress state of the person is a normal state, a "normal" image 66 is displayed on the seat icon 62, and when the stress state of the person is a relaxed state, a "relaxed" image 67 is displayed on the seat icon 62.

In this map screen, when an operation for setting a person as a notification target, for example, an operation of selecting "notification" in a menu box displayed in response to an operation of the seat icon 62 of the person to be visited, is performed, the person is set as a notification target and an email icon 68 is displayed near the seat icon 62 of the person.

Further, in this map screen, when a mouse-over operation is performed on the seat icon 62, an information display box 71 is displayed. In this information display box 71, the face image 45 of the person and characters 72 representing detailed information related to the person (name, department, phone talk state, conversation state, stress state, etc.) are displayed.

Next, description will be made of a setting process related to the presence information (stay information) and the state information, which is performed by the facility management device 2. FIG. 6 is a flowchart showing the procedure of the setting process related to the presence information and the state information.

In the facility management device 2, first, the result of the presence detection is acquired and whether the target person is present is determined (ST101). Here, in the case where the target person is absent (No in ST101), the presence information of the target person is set to "absent" (ST102), and the process is terminated.

On the other hand, in the case where the target person is present (Yes in ST101), the presence information of the target person is set to "present" (ST103). Subsequently, whether the target person is talking on the phone is determined (ST104).

Here, in the case where the target person is talking on the phone (Yes in ST104), the state information of the target person with regard to other persons is set to "talking on the phone" (ST105), and the process proceeds to ST109.

On the other hand, in the case where the target person is not talking on the phone (No in ST104), then, whether the target person is in conversation is determined (ST106).

Here, in the case where the target person is in conversation (Yes in ST106), the state information of the target person with regard to other persons is set to "in conversation" (ST107), and the process proceeds to ST109.

On the other hand, in the case where the target person is not in conversation (No in ST106), the state information of the target person with regard to other persons is set to null (ST108), and the process proceeds to ST109.

Next, the stress state of the target person is determined (ST109). Here, in the case where the degree of stress is high, the state information of the target person regarding the stress state is set to "nervous" (ST110). In the case where the degree of stress is normal, the state information of the target person regarding the stress state is set to "normal" (ST111). Also, in the case where the degree of stress is low, the state information of the target person regarding the stress state is set to "relaxed" (ST112).

The foregoing process is performed regularly at a constant period.

Next, description will be made of the notification control performed by the facility management device 2. FIG. 7 is a flowchart showing the operating procedure of the notification control.

First, it is determined whether there is any person set as a notification target (ST201). Here, when there is any person set as a notification target (Yes in ST201), a process of notification determination is performed for all persons set as notification targets (ST202 to ST206).

In the process of notification determination, first, it is determined whether a target person is present (ST203). Here, in the case where the target person is present (Yes in ST203), electronic mail is transmitted to the user terminal 3 of the person (ST204). Subsequently, the person for whom the notification has been made is removed from the notification targets (ST205). On the other hand, in the case where the person is absent (No in ST203), no particular process is performed and the process is performed on the next person.

The foregoing process is performed regularly at a constant period.

Note that in the foregoing, the notification control was described by taking the notification function using electronic mail as an example, but it is also possible to have a timely notification received by application push notification function of an application regarding the staying status presentation installed in the user terminal 3 or by web push notification function.

In the foregoing, description has been made of the embodiment as an example of technology disclosed in the present application. However, the technology in the present disclosure is not limited to this and may be applied to embodiments in which modification, replacement, addition, omission, etc. are made. Also, it is possible to combine various structural elements described in the above embodiment to make a novel embodiment.

INDUSTRIAL APPLICABILITY

The staying status display system and the staying status display method according to the present invention have an effect of capable of presenting to the user whether the person to be visited is staying in the target area and whether the person to be visited is in a state where the person is unable to deal with a visitor, and are useful as a staying status display system and a staying status display method for generating display information regarding the person staying status in the target area based on the images captured by the camera installed in the target area in the facility.

GLOSSARY 1 camera
2 facility management device
3 user terminal
21 communication device
22 processor
23 storage
24 display
25 input device
45 face image (person image)
51 "in-conversation" icon (state icon)
52 "on-phone" icon (state icon)
53 "nervous" icon (state icon)
54 "normal" icon (state icon)
55 "relaxed" icon (state icon)
56 email icon
61 presence map
62 seat icon (state icon)
63 area map
65 "nervous" image
66 "normal" image
67 "relaxed" image
68 email icon
71 information display box

The invention claimed is:

1. A staying status display system for executing, with a processor, a process of acquiring, in real time, images captured by a camera installed in a target area and generating display information regarding a current person staying status in the target area,
wherein the processor is configured to
detect whether there is any person staying in the target area based on the images from the camera,
detect whether each person staying in the target area is in at least one of a phone talk state, a conversation state, and a stress state such that the person is in a state unable to deal with a visitor based on the images from the camera,
generate display information for displaying state information regarding whether each person is in the state unable to deal with a visitor, together with stay information regarding whether there is any person staying in the target area,
receive an operation of a user of selecting a person and setting the selected person as a notification target, and
when the stay information regarding the person set as a notification target is updated to a present state and the state information of the person set as a notification target is updated to a state suitable to visit, which is none of the phone talk state, the conversation state, and the stress state, transmit a notification representing the updating of the stay information and the state information to a user terminal.

2. The staying status display system according to claim 1, wherein the processor is configured to
generate a person list screen in which person images are displayed in an arrangement, and
display a state icon representing whether each person is in the state unable to deal with a visitor in the person list screen as the state information.

3. The staying status display system according to claim 1, wherein the processor is configured to
generate a map screen in which a state icon representing whether each person is in the state unable to deal with a visitor is superimposed, as the state information, at a position of a corresponding person on a map image representing the target area, and
in response to an operation of a user selecting a person, display a person image of the selected person on the map screen.

4. The staying status display system according to claim 1, wherein
the processor
determines whether or not the person set as a notification target is in the phone talk state;
determines whether or not the person set as a notification target is in the conversation state;
determines whether or not the person set as a notification target is in the stress state;
determines that the person set as a notification target is in the state suitable to visit when the person set as a notification target is determined not in the phone talk state, not in the conversation state and not in the stress state; and
transmits the notification representing the updating of the stay information and the state information to the user terminal, in response to determining that the person set as a notification target is in the state suitable to visit.

5. The staying status display system according to claim 1, wherein
when the state information of the person set as a notification target is updated to at least one of the phone talk state, the conversation state, and the stress state, the notification representing the updating of the stay information and the state information is not transmitted to the user terminal.

6. The staying status display system according to claim 1, wherein the notification indicates that the current timing is suitable to visit the person set as a notification target.

7. The staying status display system according to claim 1, wherein the display information is generated such that
the state information of a person is displayed with a button to select the person as a notification target, when the person is detected in at least one of the telephone talk state, the conversation state and the stress state such that the person is in the state unable to deal with a visitor, and
the state information of a person is displayed without the button to select the person as a notification target, when the person is detected in the state suitable to visit, which is none of the telephone talk state, the conversation state and the stress state.

8. A staying status display method for executing, with a processor, a process of acquiring, in real time, images captured by a camera installed in a target area and generating display information regarding a current person staying status in the target area, the method comprising:
detecting whether there is any person staying in the target area based on the images captured by the camera,
detecting whether each person staying in the target area is in at least one of a phone talk state, a conversation state, and a stress state such that the person is in a state unable to deal with a visitor based on the images captured by the camera,
generating display information for displaying state information regarding whether each person is in the state unable to deal with a visitor, together with stay information regarding whether there is any person staying in the target area, receiving an operation of a user of selecting a person and setting the selected person as a notification target, and when the stay information regarding the person set as a notification target is updated to a present state and the state information of the person set as a notification target is updated to a state suitable to visit, which is none of the phone talk state, the conversation state, and the stress state, transmitting a notification representing the updating of the stay information and the state information to a user terminal.

\* \* \* \* \*